United States Patent [19]

Le Berre et al.

[11] Patent Number: 4,499,458

[45] Date of Patent: Feb. 12, 1985

[54] LIQUID CRYSTAL DISPLAY DEVICE ASSOCIATING TWO ADDRESSING MODES

[75] Inventors: Serge Le Berre; Michel Hareng, both of Paris, France

[73] Assignee: Thomson-CSF, Paris, France

[21] Appl. No.: 386,522

[22] Filed: Jun. 9, 1982

[30] Foreign Application Priority Data

Jun. 10, 1981 [FR] France .................. 81 11394

[51] Int. Cl.³ .............................. G09G 3/36
[52] U.S. Cl. .................. 340/713; 340/784; 340/783; 350/333
[58] Field of Search ........... 340/713, 714, 783, 784, 340/789, 811; 350/331 R, 332, 333

[56] References Cited

U.S. PATENT DOCUMENTS

| | | | |
|---|---|---|---|
| 4,031,529 | 6/1977 | Borel et al. | 340/713 |
| 4,040,047 | 8/1977 | Hareng et al. | 340/784 |
| 4,202,010 | 5/1980 | Hareng et al. | 340/784 |
| 4,310,858 | 1/1982 | Hareng et al. | 340/713 |
| 4,391,492 | 7/1983 | Lu et al. | 350/333 |
| 4,430,650 | 2/1984 | Billard et al. | 340/713 |

OTHER PUBLICATIONS

IBM J. Res. Development, vol. 26, No. 2, pp. 177–185, Mar. 1982, "The Application of GaAlAs Lasers to High Resolution Liquid Crystal Projection Displays", Dewey & Crow.

*Primary Examiner*—Gerald L. Brigance
*Attorney, Agent, or Firm*—Oblon, Fisher, Spivak, McClelland & Maier

[57] ABSTRACT

The present invention relates to cells using a smectic phase liquid crystal film and provides in the same cell two addressing modes: optical addressing by means of a laser beam and matrix addressing by means of heating electrodes.

3 Claims, 1 Drawing Figure

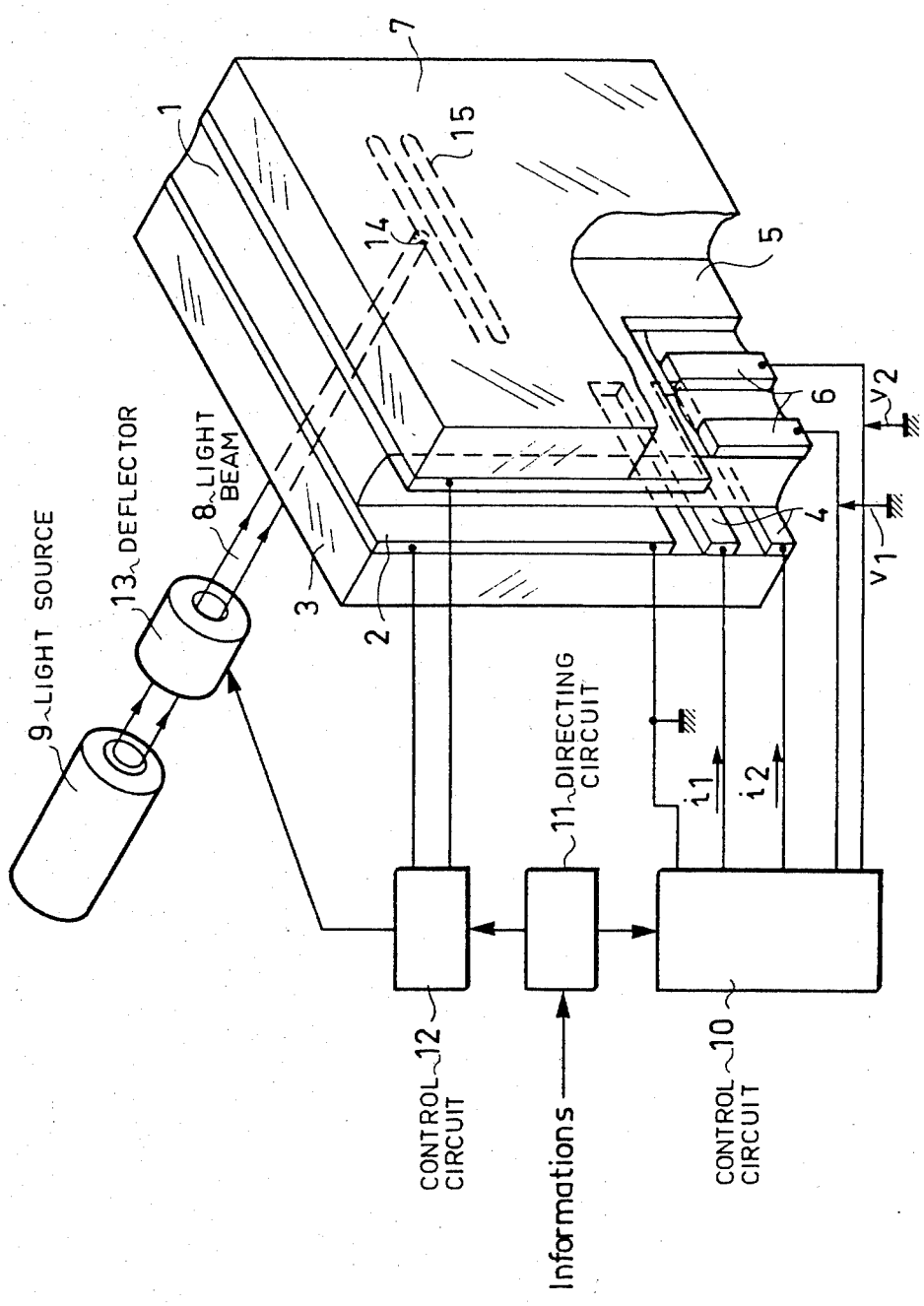

LIQUID CRYSTAL DISPLAY DEVICE ASSOCIATING TWO ADDRESSING MODES

BACKGROUND OF THE INVENTION

1. Field of the Invention

The present invention relates to liquid crystal cells, more particularly those using a smectic phase liquid crystal for the purpose of displaying images or patterns. It relates more particularly to devices using two addressing modes: optical addressing by means of a laser beam and matrix addressing by means of heating electrodes.

2. Description of the Prior Art

The use is known in the prior art of the thermo-optical effect in smectic phase liquid crystals for storing and displaying information. This effect has in particular been used in a laser addressing optical valve for constructing a high resolution projection display. A screen comprising 2000×2000 resolution dots can be easily formed. The typical dimension of a dot is then 20 microns. To erase the recorded image, it is possible either to scan the cell with the light beam at full strength and then slowly cool the layer, or to subject the layer to an alternating field with or without beam scanning. The problem with this type of display is however, for some applications, its writing speed: of the order of some $10^4$ dots per second.

Use is also known in the prior art of matrix addressing for displaying information at television rate with electrode networks whose pitches are typically between 20 and 100 microns. This method however requires, for smectic phase mesomorphic materials, that the liquid crystal layer be heated, for example by Joule effect, by causing an electric current to flow in strip shaped resistive elements.

The present invention proposes combining these two types of display to solve the problem often posed of a display with high resolution and slow to moderate renewal rate (a few seconds for example) with visualization of more elementary information at a rapid rate. This will generally be the display of a few alphanumeric characters in one of the corners of the screen (advance of a counter, of an index, of the time etc . . . ). The device proposed is particularly intended to be observed by reflection and projection on a screen. The mesomorphic material may also contain dispersed particles having a modulating effect on the reading radiation of the cell.

SUMMARY OF THE INVENTION

The invention has as object a data display device comprising a mesomorphic material layer presenting a smectic phase and means for modifying the optical properties of said layer under the influence of electric signals representative of said data; said layer being disposed between electrodes; wherein one of the electrodes comprises a first continuous area and a second area formed from parallel heating strips; the other electrodes comprising, facing said first area, a continuous electrode and, facing the second area, a network of conducting strips intersecting said heating strips; the assembly formed by said liquid crystal layer and said electrodes being clamped between two plates one at least of which is transparent.

BRIEF DESCRIPTION OF THE DRAWINGS

Other aspects and advantages of the invention will be clearer from the following description given by way of non limiting example, as well as the accompanying FIGURE which is a view of a cell in accordance with the invention and its addressing system. In this FIGURE a section has been made to show more clearly certain details of the invention. Only two lines and two columns have been shown so as not to overload the FIGURE.

DESCRIPTION OF THE PREFERRED EMBODIMENT

In this example, the liquid crystal used presents a smectic phase A, that is to say that the long molecules which form the mesomorphic material are perpendicular to the plane of the layers. This alignment has been facilitated by an adequate treatment of the walls. The crystal is then transparent in the rest condition. The liquid crystal layer 1 is clamped between two supports 3 and 7 provided with electrodes. A first electrode 2 made from aluminium deposited on a glass substrate 3 previously coated by a multi-layer treatment not shown, comprises a continuous area reserved for the laser addressing mode and, in a cut-out in this area, a set of teeth 4 assigned to the matrix addressing mode.

Support 7 carries a second electrode formed from a continuous area 5 having the same morphology as the continuous area of electrode 2.

Area 5 is arranged facing the other continuous area as shown in the FIGURE. Support 7 also carries a network of conducting strips 6 arranged in a cut-out of electrode 5; these conducting strips 6 forming with electrode 5 an array of isolated electrodes. The network 6 of coplanar strips is orientated so that it covers the network of teeth 4, each tooth facing all the strips of the network 6. This arrangement, which may be orthogonal, forms an array of intersections for providing electric matrix addressing of layer 1. The electrodes carried by one at least of supports 3 and 7 are formed from a transparent material. For example, it may be tin or indium oxide deposits or a mixture of these two oxides (ITO electrode). Support 7 may be formed in the same way as support 3. The multilayer treatment mentioned above is intended to match the index of support 3 or 7 to that of aluminium so as to ensure with the minimum of reflection, the transfer of the light radiation to the metal layer during laser addressing. It is in fact known that the energy transported by this radiation serves for heating the liquid crystal layer. It is then possible to address the liquid crystal layer in a first sector defined by the extent of the continuous areas of electrodes 2 and 5 by means of a laser beam 8 supplied by a laser 9.

By way of non limiting example, the laser 9 may be a gallium arsenide semiconductor laser or a YAG type laser having a solid active medium.

A second sector of the liquid crystal layer comprised between conducting strips 6 and teeth 4 is subjected to matrix addressing by means of heating electrodes. Teeth 4 are arranged in a network for example with 20 micron pitch so as to obtain the same resolution as on the part of the screen with laser beam display. With electrode 2 grounded, teeth 4, which in this example are lines of the matrix network, have one of their ends grounded. An electronic device 10 delivers heating voltages for each tooth 4 so as to heat the facing liquid crystal to the temperature allowing use to be made of the thermo-optical effect during cooling after heating. It is known that the thermo-optical effect may be applied in two different ways depending on whether the data to be displayed influences the intensity of beam 8 or the value of an electric field induced in liquid crystal layer 1 by electrodes 2 and 5.

With a view to simplification, there will only be described here the case where the intensity of beam 8 is constant, it being understood of course that the other operating mode is also included within the scope of the invention.

The accompanying FIGURE also shows the device controlling the two modes of addressing the cell. The data to be displayed is in the form of electric signals applied to the input of a switching circuit 11 which switches them, depending on their display mode, either to the input of a deflection control circuit 12 or to the input of a control circuit 10. Circuit 12 controls an optical deflector 13 for scanning the continuous area with spot 14 produced by impact of beam 8. Spot 14 may describe a scanning frame shown in the FIGURE by the broken line 15. Circuit 12 supplies electrodes 2 and 5 so as to induce simultaneously an electric field in the liquid crystal layer. This electric field whose strength depends on the data to be displayed cooperates with the scanning of the beam so as to provide, at each point of the liquid crystal layer, the desired diffusion state.

According to the invention, the display mode which has just been described is completed by a matrix display provided by the control circuit 10. For this purpose, it delivers heating currents ($i_1$, $i_2$) to teeth 4 and electric voltages ($v_1$, $v_2$) to strips 6. More precisely, the control circuit 10 fulfils the following functions:

it provides heating of the lines which are brought successively to the potential required for causing heating of the liquid crystal, it maintains, in a buffer memory, the video voltages which have to be applied through strips 6 during the cooling phase of the liquid crystal so as to obtain the desired diffusion state.

The data written in the laser display sector may be erased as a whole or locally. For local erasure, an advantageous process consists in applying between electrodes 2 and 5 an alternative erasure voltage.

One of the principal advantages of the device of the invention is the simplicity of construction. In fact, the liquid crystal layer used for the two display modes is the same. By way of non limiting example, cyano-octyl-biphenyl may be mentioned of formula:

whose phase transitions are:

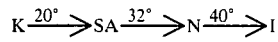

Thus, as has been seen, it is possible to form in a single block grounded electrode 2 which has a role to play in both addressing modes. This integration of the two display modes does not result in any complication of a technological kind and in particular it is not at all necessary to split the liquid crystal layer into two isolated areas.

Should there be a momentary cut in the power supply in the matrix addressing sector, this latter presents a memory phenomenon. This is a well known advantage of smectic phase liquid crystals.

What is claimed is:

1. A liquid crystal display device comprising:

a cell including two plates, at least one of which is transparent, a continuous layer of smectic liquid crystal enclosed between said two plates, and two electrodes supported on the respective internal faces of said plates;

first and second means for modifying the optical properties of said layer wherein each of said means are supplied by electrical signals representative of data to be displayed and wherein said first and second means produce a heating and cooling cycle on a first and second display portion with said first display portion being defined by the area where each of said two electrodes is continuous and with said second display portion being defined by the area formed by the crossing of a pair of crossed sets of striped portions of each electrode with each set of striped portions being associated with a respective one of said electrodes and wherein said pair of crossed sets of striped portions defines an addressing matrix whose heating is caused by a current crossing one of said sets of stripes, wherein said first means for modifying comprises an optical beam scanning means for scanning said first display portion and said second means for modifying comprises a current generating means to heat said second display portion; and control means including a switching means which feeds said electrical signals to one of a first circuit means for controlling an optical deflector in order to control said beam scanning means, and a second circuit means for controlling said addressing matrix depending upon an addressing mode fed to said control means.

2. The device as claimed in claim 1, wherein said surfaces in contact with said layer are treated in order to promote preferential orientation of the molecules of said layer.

3. The device as claimed in claim 1, wherein one of said plates is comprised of a multilayer structure in order to permit the index of refraction of said plate to be matched with that of its supporting associated electrode.

* * * * *